US011714968B2

(12) United States Patent
Batra et al.

(10) Patent No.: US 11,714,968 B2
(45) Date of Patent: Aug. 1, 2023

(54) IDENTIFYING DATA OF INTEREST USING MACHINE LEARNING

(71) Applicant: American Express Travel Related Services Company, Inc., New York, NY (US)

(72) Inventors: Ravi Batra, Jersey City, NJ (US); Sandeep Bose, Scottsdale, AZ (US); Mario Fragoso, Phoenix, AZ (US); Ravneet Ghuman, Phoenix, AZ (US); Madhu Sudan Reddy Gudur, Phoenix, AZ (US); Suraj Madnani, River Edge, NJ (US); Curtis T. Merryweather, Madison, NJ (US); Ravi Varma, White Plains, NY (US); Vinod Yadav, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/679,498

(22) Filed: Feb. 24, 2022

(65) Prior Publication Data
US 2022/0391593 A1 Dec. 8, 2022

Related U.S. Application Data

(63) Continuation of application No. 16/215,961, filed on Dec. 11, 2018, now Pat. No. 11,288,456.

(51) Int. Cl.
*G06F 40/30* (2020.01)
*G06F 16/95* (2019.01)
(Continued)

(52) U.S. Cl.
CPC ............. *G06F 40/30* (2020.01); *G06F 16/95* (2019.01); *G06F 40/295* (2020.01); *G06N 5/045* (2013.01);
(Continued)

(58) Field of Classification Search
None
See application file for complete search history.

(56) References Cited

U.S. PATENT DOCUMENTS 10,338,968 B2   7/2019   Bequet
10,380,236 B1   8/2019   Ganu
(Continued)

*Primary Examiner* — Jakieda R Jackson
(74) *Attorney, Agent, or Firm* — Sterne, Kessler, Goldstein & Fox P.L.L.C.

(57) ABSTRACT

Systems and methods for identifying data of interest are disclosed. The system may retrieve unstructured data from an internet data source via an alert system or RSS feed. The system may input the unstructured data into various models and scoring systems to determine whether the data is of interest. The models and scoring systems may be executed in order or in parallel. For example, the system may input the unstructured data into a Naïve Bayes machine learning model, a long short-term memory (LSTM) machine learning model, a named entity recognition (NER) model, a semantic role labeling (SRL) model, a sentiment scoring algorithm, and/or a gradient boosted regression tree (GBRT) machine learning model. Based on determining that the unstructured data is of interest, a data alert may be generated and transmitted for manual review or as part of an automated decisioning process.

20 Claims, 5 Drawing Sheets

(51) Int. Cl.
    *G06N 5/045*     (2023.01)
    *G06N 20/00*     (2019.01)
    *G06F 40/295*     (2020.01)
    *G06Q 40/02*     (2023.01)
    *G06N 3/08*     (2023.01)
    *G06N 3/044*     (2023.01)

(52) U.S. Cl.
    CPC .............. *G06N 20/00* (2019.01); *G06N 3/044* (2023.01); *G06N 3/08* (2013.01); *G06Q 40/02* (2013.01)

(56) References Cited

U.S. PATENT DOCUMENTS

| | | |
|---|---|---|
| 2016/0203498 A1 | 7/2016 | Das |
| 2017/0097984 A1* | 4/2017 | Haldar ................. G06F 16/288 |
| 2018/0018582 A1 | 1/2018 | Unsal |
| 2018/0018741 A1 | 1/2018 | Mukherjee |
| 2018/0095619 A1 | 4/2018 | Liu |
| 2018/0121549 A1 | 5/2018 | Ramesh |
| 2018/0150524 A1 | 5/2018 | Anger |
| 2019/0114569 A1 | 4/2019 | Palmer, II |
| 2019/0179903 A1 | 6/2019 | Terry |
| 2019/0180097 A1 | 6/2019 | Ferguson |
| 2019/0180196 A1 | 6/2019 | Terry |
| 2019/0228099 A1 | 7/2019 | Bajaj |
| 2019/0236139 A1 | 8/2019 | DeFelice |
| 2019/0296978 A1* | 9/2019 | Seshadri ............ H04L 41/0894 |
| 2020/0019893 A1* | 1/2020 | Lu .......................... G06N 5/025 |
| 2020/0074707 A1 | 3/2020 | Lee |
| 2020/0110842 A1 | 4/2020 | Teo |
| 2020/0160196 A1 | 5/2020 | Ramakrishnan |
| 2020/0175961 A1 | 6/2020 | Thomson |

\* cited by examiner

IDENTIFYING DATA OF INTEREST USING MACHINE LEARNING

CROSS REFERENCE

This application is a continuation of U.S. patent application Ser. No. 16/215,961, filed Dec. 11, 2018, which is incorporated by reference herein in its entirety.

FIELD

The disclosure generally relates to machine learning, and more specifically, to systems and methods for identifying data of interest using a trained machine learning model.

BACKGROUND

Unstructured datasets may exist in various sizes and forms. With the significant expansion of information on the internet in the form of unstructured datasets (e.g., news articles, blogs, social media, forums, audio, video, etc.), it is increasingly time consuming to scan through and research all available information. Web-based search engines may be used to generally search for information of interest. However, the delay between important information being published and the information becoming common knowledge can vary depending on the parties involved as well as the information itself. For example, financial institutions may base decisions on reviewing publicly available information about entities, including employee layoffs, bankruptcy filings, store closings, and the like. A technical problem is that the use of search engines typically requires manual search input and review of information, thus delaying the identification of data of interest.

SUMMARY

Systems, methods, and articles of manufacture (collectively, the "system") for the identifying data of interest are disclosed. The system may retrieve unstructured data from an internet data source, wherein the unstructured data is retrieved directly or from a web link hosting the unstructured data. The system may input the unstructured data into a first machine learning model, a second machine learning model, a named entity recognition (NER) model, and a semantic role labeling (SRL) model. The system may calculate a sentiment score by inputting the unstructured data into a sentiment scoring algorithm. The system may identify the unstructured data to be of interest in response to an output of at least one of the first machine learning model, the second machine learning model, the NER model, the SRL model, or the sentiment score indicating that the unstructured data has a probability of being of interest.

In various embodiments, the system inputs the output of at least one of the first machine learning model, the second machine learning model, the NER model, the SRL model, or the sentiment score into a gradient boosted regression tree (GBRT) machine learning model. The system may identify the unstructured data to be of interest based on a final output from the GBRT machine learning model.

In various embodiments, the system may generate a data alert in response to identifying the unstructured data to be of interest, wherein the data alert comprises at least one of the unstructured data, the web link, or the output of at least one of the first machine learning model, the second machine learning model, the NER model, the SRL model, or the sentiment score. The system may transmit the data alert to be processed by a financial decisioning system.

In various embodiments, the system may preprocess the unstructured data by performing a part-of-speech tagging process or by removing at least one of embedded web links, email links, or numbers. The first machine learning model may comprise a Naïve Bayes machine learning model and the second machine learning model may comprise a long short-term memory (LSTM) machine learning model.

In various embodiments, at least one of the first machine learning model or the second machine learning model are trained using a generated training dataset. The generated training dataset may be generated by filtering public business data based on one or more training keywords. The one or more training keywords may be identified by analyzing prefiltered training data using at least one of a latent Dirichlet allocation (LDA) model, a correlated topic model, a word2vec processing algorithm, a word frequency analysis, or a phrase frequency analysis. The generated training dataset may be prefiltered by at least one of a parts-of-speech tagging process, a lemmatization process, removing stop words, generating n-grams, normalizing or filtering email IDs, numbers, and URLs, or replacing proper nouns with common nouns.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

In various embodiments, a system for identifying data of interest is disclosed. The system may implement various natural language processing (NLP) techniques and machine learning models to identify data of interest retrieved as unstructured datasets from the interne. The system may also be configured to curate model training data used to train one or more machine learning models. The system may curate the model training data by identifying keywords from a known sample dataset. The keywords may be based on a particular area of business, as discussed further herein. The system may analyze data from a training dataset and may classify data from the training dataset based on the keywords to generate the training data.

The system may be configured to identify a topic of interest together with how it relates to a particular entity. In that respect, the system may function as a "subject matter expert" that can be trained to address and identify data of interest in various areas of business. For example, and in accordance with various embodiments, in finance the system may be used to identify data of interest for one or more entities corresponding to monetary risk indicators, security risk indicators, compliance and regulatory changes, data breaches, and the like. In that regard, the identified data may be used in financial decisioning processes such as, for example, in closing or limiting credit accounts, extending lines of credit, opening and/or closing transaction accounts, and/or the like.

This system further improves the functioning of the computer. Typically, manual browsing and review of news articles by a subject matter expert is needed to identify news, articles, posts, and the like of interest for a particular entity. By automating the identification of data of interest instead of requiring manual input, processing and identification, the user performs less computer functions and provides less input, which saves on data storage and memory which speeds processing. Moreover, by automating how a training dataset is curated and by using a plurality of scores from various machine learning models, accuracy in the identification of data of interest may be improved and the system may be easily adaptable and scalable to different types of datasets and domains that may typically require a subject matter expert's review.

Figure 1:
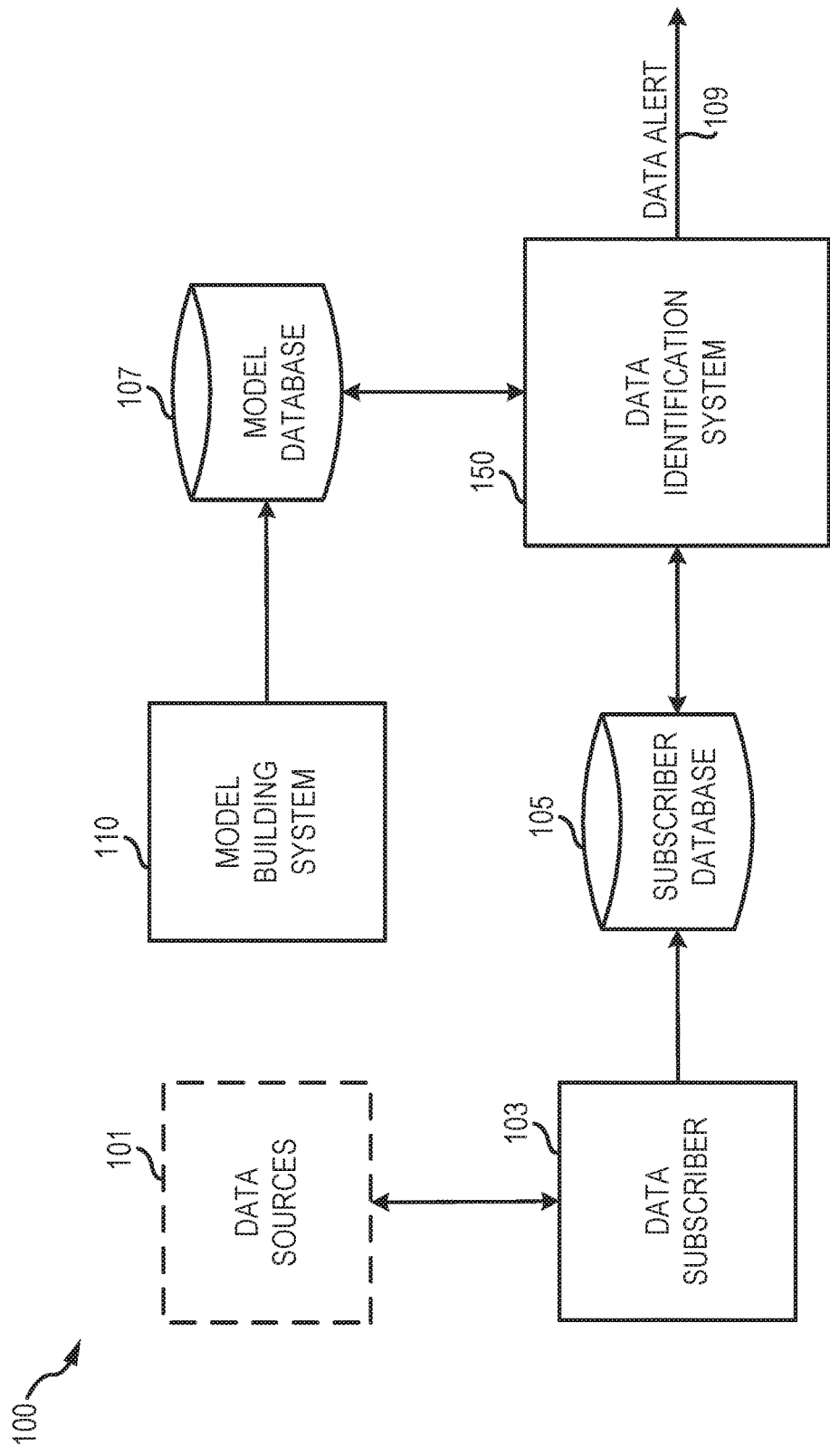
FIG. 1 is a block diagram illustrating various system components of a system for identifying data of interest, in accordance with various embodiments.

In various embodiments, and with reference to FIG. 1, a system 100 for identifying data of interest is disclosed. System 100 may comprise one or more data sources 101, a data subscriber 103, a subscriber database 105, a model database 107, a model building system 110, and/or a data identification system 150. System 100 may also contemplate uses in association with web services, utility computing, pervasive and individualized computing, security and identity solutions, autonomous computing, cloud computing, commodity computing, mobility and wireless solutions, open source, biometrics, grid computing, and/or mesh computing.

In various embodiments, data subscriber 103 may be in electronic communication with one or more data sources 101 and/or subscriber database 105. Data subscriber 103 may comprise any suitable combination of hardware, software, and/or database components, including one or more network environments, servers, computer-based systems, processors, databases, and/or the like. Data subscriber 103 may comprise any suitable software, service, API, or the like configured to enable data subscriber 103 to retrieve and/or receive data from one or more data sources 101. In various embodiments, the data may comprise unstructured datasets available on the internet as news, articles, documents, blogs, forums, social media posts, and/or the like. Each data source 101 may comprise any suitable source of data. For example, data source 101 may comprise a news website (e.g., CNN®, THE WASHINGTON POST®, FOX NEWS®, etc.), a social media platform (e.g., FACEBOOK®, INSTAGRAM®, LINKEDIN®, TWITTER®, etc.), a search engine (e.g., GOOGLE®, YAHOO®, etc.), a web feed (e.g., RSS, Atom, etc.), blogs, forums, or any other suitable or desired web resource or database.

In various embodiments, data subscriber 103 may be configured to subscribe to a data source 101 via an alert service (e.g., GOOGLE● Alerts, Talkwater Alerts™, Mention™, Meltwater™, etc.), RSS feed, or the like. In that regard, data subscriber 103 may subscribe to one or more data source 101 by establishing subscription parameters with each data source 101 such as, for example, data keywords corresponding to data that data subscriber 103 desires to receive. For example, the data keywords may comprise an entity name, an entity owner name, or the like. In response to the alert service locating published data having at least one instance of the data keyword, the alert service may provide the data (or a web link to the data) to data subscriber 103. The data source 101 subscription may be manually established, and/or may be automated through custom components that may be specific to each data source 101.

In response to retrieving and/or receiving the data, data subscriber 103 may be configured to store the data in subscriber database 105. In various embodiments, data subscriber 103 may be configured to store a web link (e.g., URL) associated with the data. Storing only the web link may decrease storage needs in subscriber database 105. Subscriber database 105 may comprise any database, data structure, or the like capable of storing and maintaining data and/or web links. Subscriber database 105 may store the data using any suitable technique or process. Subscriber database 105 may be in electronic communication with data subscriber 103 and/or data identification system 150.

In various embodiments, model building system 110 may be in electronic communication with model database 107. Model building system 110 may comprise one or more hardware, software, and/or database components. For example, model building system 110 may comprise one or more network environments, servers, computer-based systems, processors, databases, and/or the like. Model building system 110 may comprise at least one computing device in the form of a computer or processor, or a set of computers/processors, although other types of computing units or systems may be used such as, for example, a server, web server, pooled servers, or the like. Model building system 110 may also include software, such as services, APIs, and the like, configured to perform various operations discussed herein. In various embodiments, model building system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Model building system 110 may be configured to build and train various machine learning models for use in system 100. For example, and as discussed further herein, model building system 110 may be configured to generate a training dataset for use in training one or more machine learning models. The training dataset may be generated by identifying training keywords from prefiltered training data, and using the training keywords to filter publicly available data, as discussed further herein. Model building system 110 may transmit the training dataset and/or one or more trained machine learning models to model database 107. Model database 107 may be configured to store and maintain the training dataset, the trained machine learning models, or the like. Model database 107 may comprise any database, data structure, or the like capable of storing and maintaining data. Model database 107 may store the data using any suitable technique or process. Model database 107 may be in electronic communication with model building system 110 and/or data identification system 150.

Model building system 110 may comprise any suitable combination of hardware, software, and/or database components. For example, model building system 110 may comprise one or more network environments, servers, computer-based systems, processors, databases, and/or the like. Model building system 110 may comprise at least one computing device in the form of a computer or processor, or a set of computers/processors, although other types of computing units or systems may be used such as, for example, a server, web server, pooled servers, or the like. Model building system 110 may also include one or more data centers, cloud storages, or the like, and may include software, such as APIs, services, or the like, configured to perform various operations discussed herein. In various embodiments, model building system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 2:
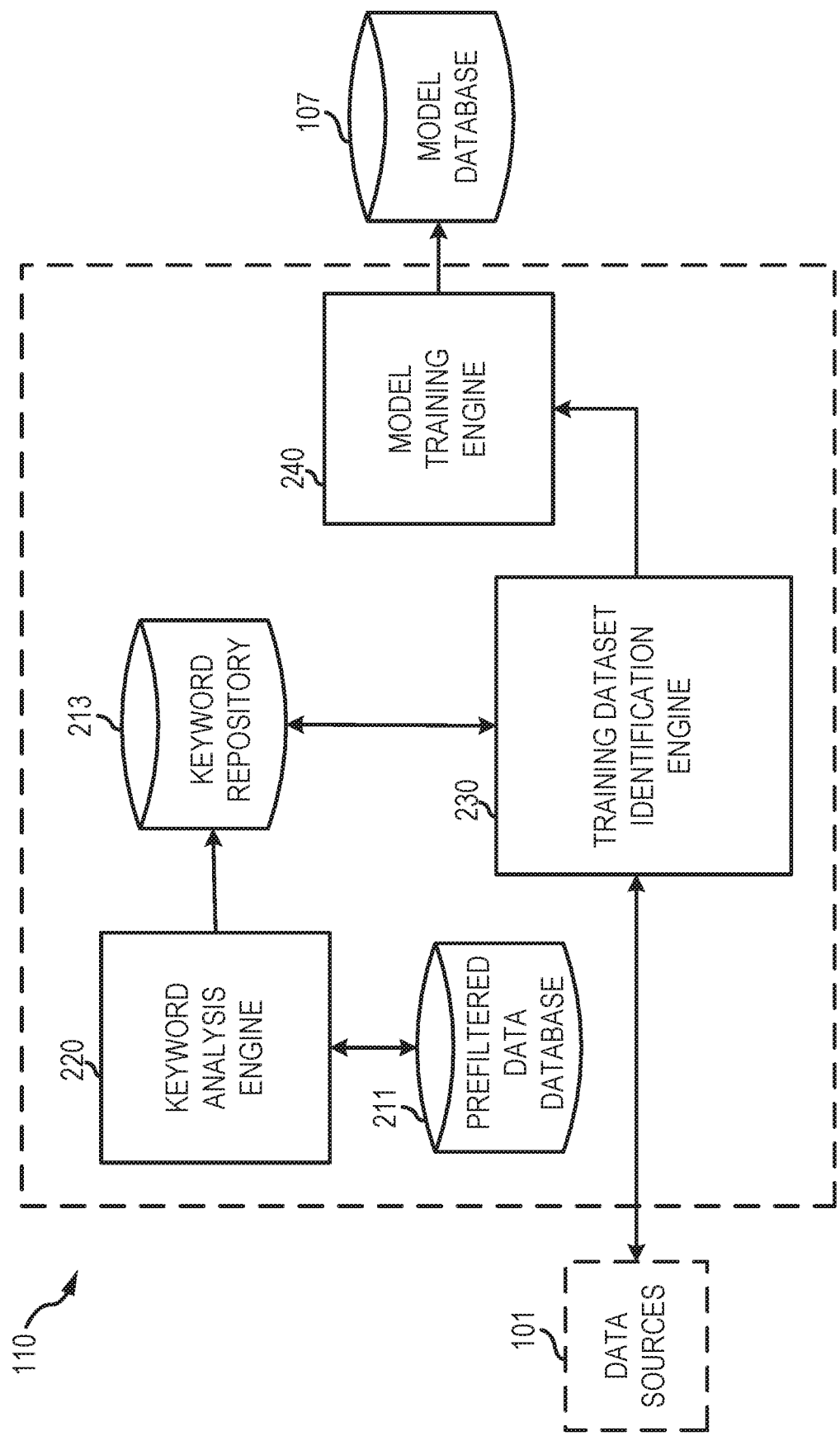
FIG. 2 is a block diagram illustrating various components of an exemplary model building system for a system for identifying data of interest, in accordance with various embodiments.

In various embodiments, model building system 110 may comprise various software components configured to aid model building system 110 in building and training models. For example, and with reference to FIG. 2, model building system 110 may comprise one or more of a prefiltered data database 211, a keyword analysis engine 220, a keyword repository 213, a training dataset identification engine 230, and/or a model training engine 240.

In various embodiments, keyword analysis engine 220 may be in electronic communication with prefiltered data database 211 and/or keyword repository 213. Keyword analysis engine 220 may be configured to identify one or more training keywords, as discussed further herein. For example, keyword analysis engine 220 may identify one or more training keywords by analyzing prefiltered training data. The prefiltered training data may comprise a curated set of data previously identified to comprise data of interest. In that regard, identification of training keywords may comprise identifying keywords that exist across datasets known to be relevant to a particular area of interest. For example, in the financial industry it may be desired to have prefiltered training data comprising news articles, posts, or the like about bankruptcy, payment delinquency, employee layoffs, store closures, lawsuits, and the like. In various embodiments, the prefiltered training data may be identified based on a manual review of curated data.

The prefiltered training data may be stored in, and retrieved from, prefiltered data database 211. Prefiltered data database 211 may be configured to store and maintain the prefiltered training data. Prefiltered data database 211 may comprise any database, data structure, or the like capable of storing and maintaining data. Prefiltered data database 211 may store the prefiltered training data using any suitable technique or process. Prefiltered data database 211 may be in electronic communication with keyword analysis engine 220.

In various embodiments, keyword analysis engine 220 may implement various natural language processing (NLP) techniques and models to aid in identifying the training keywords from the prefiltered training data. For example, keyword analysis engine 220 may implement topic modelling such as, for example latent Dirichlet allocation (LDA), correlated topic modeling, or the like. As a further example, keyword analysis engine 220 may implement text processing algorithms, such as word2vec and/or any other suitable word embedding process. In various embodiments, keyword analysis engine 220 may also implement various text analysis processes such as, for example word frequency analysis tools, phrase frequency analysis tools, and/or any other suitable text mining algorithm, tool, or the like.

In response to identifying one or more training keywords, keyword analysis engine 220 may store the training keywords in keyword repository 213. Keyword repository 213 may be configured to store and maintain the training keywords. Keyword repository 213 may comprise any database, data structure, or the like capable of storing and maintaining data. Keyword repository 213 may store the training keywords using any suitable technique or process. For example, keyword repository 213 may group the stored training keywords based on the desired subject matter topic (e.g., financial industry). Keyword repository 213 may be in electronic communication with keyword analysis engine 220 and/or training dataset identification engine 230.

In various embodiments, training dataset identification engine 230 may be in electronic communication with one or more data sources 101, keyword repository 213, and/or model training engine 240. Training dataset identification engine 230 may be configured generate a training dataset. The training dataset may be used to train a machine learning algorithm by inputting the training dataset into the machine learning algorithm, as discussed further herein (e.g., the machine learning algorithm learns from the training dataset one or more patterns that map variables to the target, and outputs a machine learning model capturing the determined relationships). Training dataset identification engine 230 may generate the training dataset by filtering the public data based on the training keywords. For example, training dataset identification engine 230 may retrieve the training keywords stored in keyword repository 213. Training dataset identification engine 230 may retrieve public data from data sources 101. For example, the public data may comprise publicly available news articles, posts, or the like concerning any suitable subject matter. In various embodiments, training dataset identification engine 230 may be configured to retrieve a large amount of public data (e.g., at least 100,000 public articles, posts, etc.) to aid in the quality of the generated training dataset. Training dataset identification engine 230 may filter the public data based on the training keywords to generate the training dataset. In that regard, the training dataset may comprise the public data having at least one of the training keywords.

In various embodiments, the number of training keywords needed to identify the training dataset may vary based on application. For example, in applications that require (or may be beneficial for) the machine learning model to identify less false positives (e.g., articles that the model thinks are relevant, but are not), training dataset identification engine 230 may filter the public data based on public data having a high number of training keywords present. As a further example, in applications that require (or may be beneficial for) the machine learning model to identify less false negatives (e.g., articles that the model thinks are irrelevant, but are relevant), training dataset identification engine 230 may filter the public data based on public data having a low number of training keywords present.

In various embodiments, training dataset identification engine 230 may also be configured to preprocess the training dataset. For example, training dataset identification engine 230 may preprocess the training dataset using any suitable preprocessing technique, such as parts-of-speech tagging, lemmatization, removing stop words, n-grams (e.g., ranging from 1 to 3), normalizing or filtering email IDs, numbers, and URLs, replacing proper nouns to common nouns, and/or the like. In response to generating and/or preprocessing the training dataset, training dataset identification engine 230 may transmit the training dataset to model training engine 240.

Model training engine 240 may be in electronic communication with training dataset identification engine 230 and/or model database 107. In response to receiving the training dataset, model training engine 240 may be configured to train one or more machine learning algorithms using the training dataset. The machine learning algorithm may comprise any suitable machine learning model or algorithm capable of identifying documents of interest. For example, the machine learning algorithm may comprise a Naïve Bayes algorithm. In various embodiments, and as a further example, the machine learning algorithm may comprise support vector machines, decision trees, LSTM neural networks, and/or any other suitable machine learning algorithm or model. Model training engine 240 may input the training dataset into the machine learning algorithm to generate the trained machine learning model. Model training engine 240 may transmit the training dataset and/or the trained machine learning model to model database 107.

In various embodiments, and with reference again to FIG. 1, data identification system 150 may be in electronic communication with subscriber database 105 and model database 107. Data identification system 150 may comprise one or more hardware, software, and/or database components. For example, data identification system 150 may comprise one or more network environments, servers, computer-based systems, processors, databases, and/or the like. Data identification system 150 may comprise at least one computing device in the form of a computer or processor, or a set of computers/processors, although other types of computing units or systems may be used such as, for example, a server, web server, pooled servers, or the like. Data identification system 150 may also include software, such as services, APIs, and the like, configured to perform various operations discussed herein. In various embodiments, data identification system 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 3:
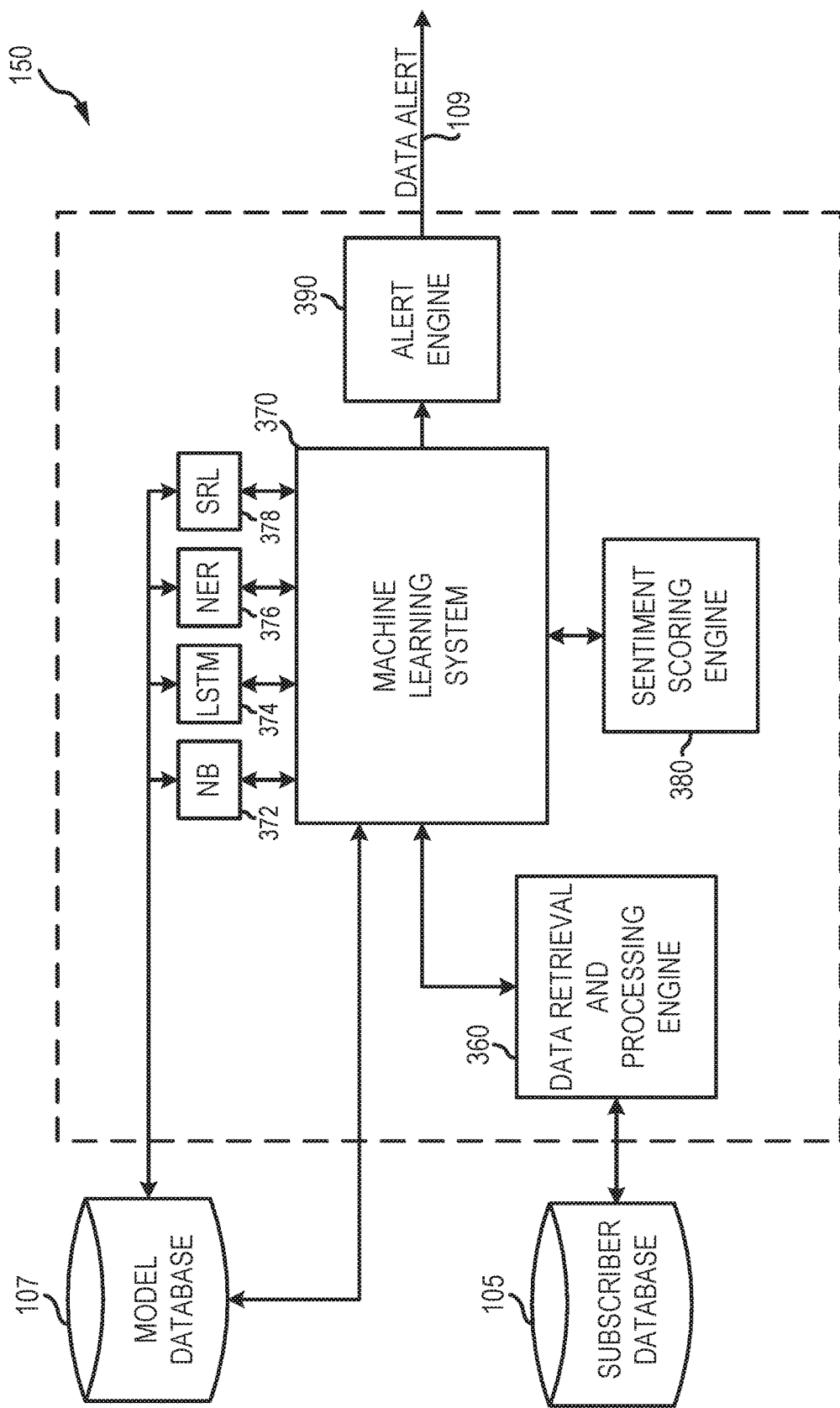
FIG. 3 is a block diagram illustrating various components of an exemplary data identification system for a system for identifying data of interest, in accordance with various embodiments.

Data identification system 150 may be configured to run a stage-wise or parallel process to evaluate data from various data sources 101. For example, data identification system 150 may run one or more machine learning models to locate data of interest received from data sources 101, as discussed further herein. In response to locating data of interest, data identification system 150 may generate a data alert 109, as discussed further herein. In various embodiments, data identification system 150 may comprise various components configured to aid data identification system 150 in identifying data of interest. For example, and with reference to FIG. 3, data identification system 150 may comprise one or more of a data retrieval and processing engine 360, a machine learning system 370, a sentiment scoring engine 380, and/or an alert engine 390.

In various embodiments, data retrieval and processing engine 360 may be in electronic communication with subscriber database 105 and/or machine learning system 370. Data retrieval and processing engine 360 may be configured to retrieve data from subscriber database 105. Data retrieval and processing engine 360 may be configured to retrieve the data at any desired interval. Data retrieval and processing engine 360 may retrieve all available data in subscriber database 105. In various embodiments, data retrieval and processing engine 360 may mark data as the data is retrieved (e.g., via metadata, tags, etc.), and may retrieve only the data that was not previously retrieved. In various embodiments, wherein a web link (e.g., URL) corresponding to the data was stored, data retrieval and processing engine 360 may be configured to retrieve the web link, access the web link, and retrieve the data corresponding to the web link.

In response to retrieving the data, data retrieval and processing engine 360 may be configured to preprocess the data. For example, data retrieval and processing engine 360 may preprocess the data by performing a part-of-speech (POS) tagging on the data; removing embedded web links, email links, numbers, or the like; and/or any other suitable or desired data preprocessing process. Data retrieval and processing engine 360 may transmit the preprocessed data to machine learning system 370.

In various embodiments, machine learning system 370 may be in electronic communication with data retrieval and processing engine 360, model database 107, sentiment scoring engine 380, and/or alert engine 390. Machine learning system 370 may be configured to execute various natural language processing, machine learning processes, and the like to aid in identifying data of interest. For example, machine learning system 370 may retrieve a Naïve Bayes machine learning model (NB 372), a long short-term memory machine learning model (LSTM 374), a named entity recognition model (NER 376), a semantic role labeling model (SRL 378), and/or the like from model database 107. Machine learning system 370 may run the data through the models to determine whether the data is of interest, as discussed further herein. Machine learning system 370 may store the output from the machine learning processes in model database 107. Machine learning system 370 may transmit the output from the machine learning processes together with the data to sentiment scoring engine 380 and/or alert engine 390.

In various embodiments, sentiment scoring engine 380 may be in electronic communication with machine learning system 370. Sentiment scoring engine 380 may be configured to generate a sentiment score to increase the accuracy in determining whether data is of interest. Sentiment scoring engine 380 may implement any suitable sentiment scoring algorithm to generate the sentiment score. For example, sentiment scoring may comprise detecting sentiment-bearing terms, determining the contextual valence and/or tonality of the terms, determining the usage of the terms, and calculating an aggregate value (e.g., the sentiment score) for the data. The sentiment score may comprise any suitable score range (e.g., 0 to 1, 1 to 100, etc.). A "high" score may indicate that the data may be of interest. A "low" score may indicate that the data may not be of interest. The scoring range to determine high scores and low scores may be manually defined, and may be adjusted to account for false positives in the system. For example, a 50 or higher out of 100 may be defined as a high score, and a 49 or below may be defined as a low score.

Based on the output from the machine learning models and the sentiment score (e.g., in response to determining that the data may be of interest), machine learning system 370 may invoke alert engine 390 to generate a data alert 109. For example, machine learning system 370 may invoke alert engine 390 by transmitting the machine learning model outputs and/or the sentiment score to alert engine 390.

In various embodiments, alert engine 390 may be in electronic communication with machine learning system 370. Alert engine 390 may be configured to generate data alert 109 in response to being invoked by machine learning system 370. Data alert 109 may comprise the data, the web link corresponding to the data, the machine learning outputs, the sentiment score, and/or any other suitable or desired information. For example, alert engine 390 may retrieve data and/or the web link corresponding to the data from machine learning system 370 (and/or data retrieval and processing engine 360). In response to generating data alert 109, alert engine 390 may transmit data alert 109 for review or processing. For example, and in accordance with various embodiments, data alert 109 may be manually reviewed. Based on the manual review, feedback may be provided to model building system 110 to update future training datasets in response to identifying false positives. As a further example, and in accordance with various embodiments, data alert 109 may be transmitted to one or more internal decisioning engines for additional processing.

Figure 4:
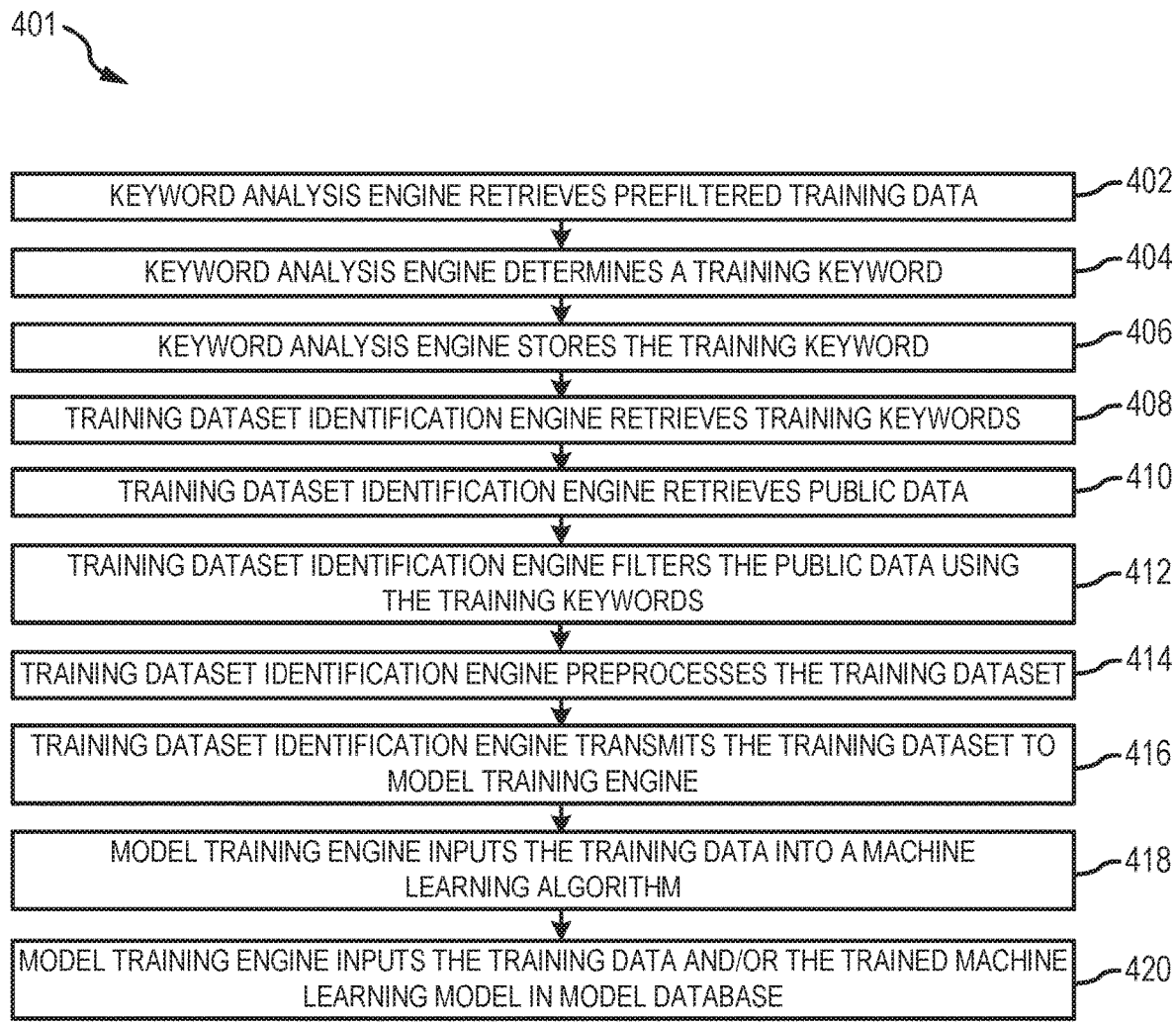
FIG. 4 illustrates a process flow for a method of training a machine learning model, in accordance with various embodiments.
Figure 5:
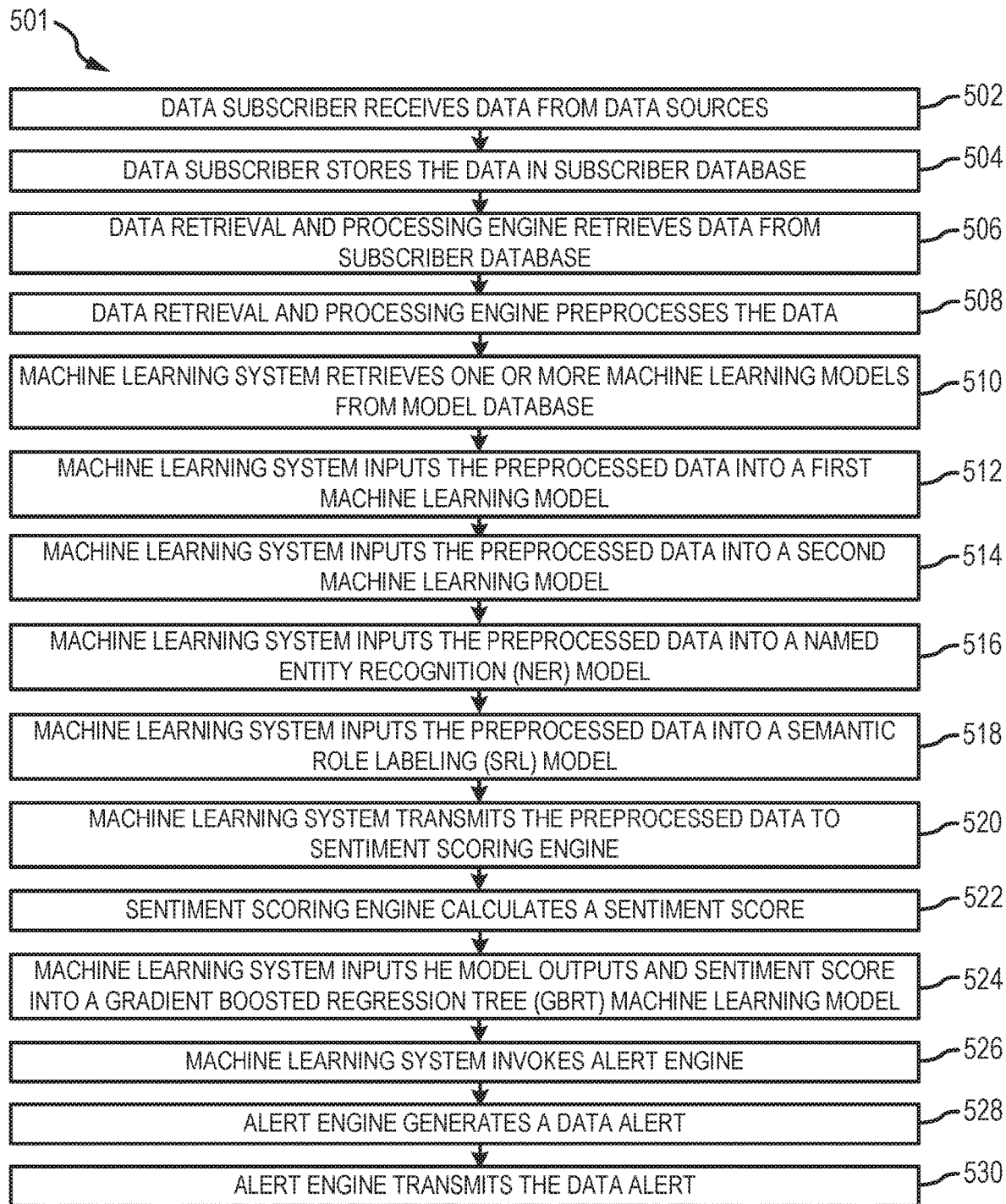
FIG. 5 illustrates a process flow for a method of identifying data of interest using a trained machine learning model, in accordance with various embodiments.

Referring now to FIGS. 4 and 5 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 4 and 5, but also to the various system components as described above with reference to FIGS. 1-3. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 4, a method 401 for training a machine learning model is disclosed. Keyword analysis engine 220 retrieves prefiltered training data (step 402) from prefiltered data database 211. The prefiltered training data may comprise a curated dataset previously identified to comprise data of interest to be used to identify one or more training keywords, as discussed further herein. For example, the prefiltered training data may comprise a small dataset based on a manual review of various articles, news, posts, or the like. In that respect, the prefiltered training data may be known to comprises data that may be of interest in the system. Keyword analysis engine 220 determines a training keyword (step 404) by analyzing the prefiltered training data. The training keywords may comprise words frequently occurring in data of interest and may be used as a future identifier for articles of interest. Keyword analysis engine 220 may implement various natural language processing (NLP) techniques and models to aid in identifying the training keywords. For example, keyword analysis engine 220 may implement topic modelling such as, for example, latent Dirichlet allocation (LDA), correlated topic modeling, or the like. As a further example, keyword analysis engine 220 may implement text processing algorithms, such as word2vec and/or any other suitable word embedding process. In various embodiments, keyword analysis engine 220 may also implement various text analysis processes such as, for example, word frequency analysis tools, phrase frequency analysis tools, and/or any other suitable text mining algorithm, tool, or the like. In various embodiments, any suitable number of text analysis processes may be used to identify the training keywords. Keyword analysis engine 220 stores the training keyword in keyword repository 213 (step 406), in response to determining one or more training keywords.

In various embodiments, training dataset identification engine 230 retrieves the training keywords (step 408) from keyword repository 213. Training dataset identification engine 230 retrieves public data (step 410) from one or more data sources 101. Training dataset identification engine 230 filters the public data using the training keywords (step 412) to generate a training dataset. The public data may comprise a large dataset of articles, posts, news, or the like in a given area of interest (e.g., business, finance, etc.). Training dataset identification engine 230 may filter the public data by identifying the public data having instances of the training keywords. In various embodiments, training dataset identification engine 230 may also be configured to account for synonyms, hypernyms, and/or hyponyms of the training keywords during filtering of the public data.

Training dataset identification engine 230 preprocesses the training dataset (step 414). For example, training dataset identification engine 230 may preprocess the training dataset using any suitable preprocessing technique such as, for example, parts-of-speech tagging, lemmatization, removing stop words, n-grams (e.g., ranging from 1 to 3), normalizing or filtering email IDs, numbers, and URLs, replacing proper nouns to common nouns, and/or the like. In various embodiments, training dataset identification engine 230 may be configured to preprocess the training dataset using all the above preprocessing techniques. In that respect, the training dataset may be preprocessed to increase the ability of machine learning algorithms to learn from the training data. Training dataset identification engine 230 transmits the training dataset to model training engine 240 (step 416).

In various embodiments, model training engine 240 inputs the training dataset into a machine learning algorithm (step 418) to generate a trained machine learning model. For example, the machine learning algorithm may comprise a Naïve Bayes algorithm. The machine learning algorithm may learn from the training dataset one or more patterns that map words or phrases to the target keywords. In response to processing the training dataset, the machine learning algorithm may output a machine learning model capable of identifying data of interest, as discussed further herein. Model training engine 240 stores the training data and/or the trained machine learning model in model database 107 (step 420).

With specific reference to FIG. 5, a method 501 for identifying data of interest using a training machine learning model is disclosed. Data subscriber 103 receives data from data sources 101 (step 502). Data subscriber 103 may be configured to subscribe to one or more data sources 101 via an alert service (e.g., GOOGLE● Alerts, Talkwater Alerts™, Mention™, Meltwater™, etc.), RSS feed, or the like. In response to receiving the data, and/or an alert for subscribed data, data subscriber 103 stores the data in subscriber database 105 (step 504). In various embodiments, data subscriber 103 may be configured to store a web link (e.g., URL) associated with the data. Data subscriber 103 may be configured to store only the web link, or may store the web link together with the received data.

In various embodiments, data retrieval and processing engine 360 retrieves data from subscriber database 105 (step 506). Data retrieval and processing engine 360 may be configured to retrieve the data at any desired interval. Data retrieval and processing engine 360 may retrieve all available data in subscriber database 105. In various embodiments, data retrieval and processing engine 360 may mark data as the data is retrieved (e.g., via metadata, tags, etc.), then compare new data to previous data such that the system may retrieve only the data that was not previously retrieved. In various embodiments, wherein a web link (e.g., URL) corresponding to the data was stored, data retrieval and processing engine 360 may be configured to retrieve the web link, access the web link, and retrieve the data corresponding to the web link. For example, and in accordance with various embodiments, data retrieval and processing engine 360 may extract data from the web link including title, text, author, date published, embedded URLs, or the like. Data retrieval and processing engine 360 may be configured to exclude interactive content (e.g., images, videos, etc.), advertisements, or the like.

In various embodiments, data retrieval and processing engine 360 preprocesses the data (step 508). For example, data retrieval and processing engine 360 may preprocess the data by performing a part-of-speech (POS) tagging on the data; removing embedded web links, email links, numbers, or the like; and/or any other suitable or desired data preprocessing process. In various embodiments, data retrieval and processing engine 260 may preprocess the data by performing any suitable number of the above-mentioned processes. In that respect, the data may be preprocessed to increase the ability of the system to successfully and accurate identify data of interest, as discussed further herein. Data retrieval and processing engine 360 transmits the preprocessed data to machine learning system 370.

In various embodiments, machine learning system 370 retrieves one or more machine learning models from model database 107 (step 510). For example, machine learning system 370 may retrieve a first machine learning model, a second machine learning model, a named entity recognition model (NER 376), a semantic role labeling model (SRL 378), and/or the like from model database 107. The first machine learning may comprise a Naïve Bayes machine learning model (NB 372). For example, and in accordance with various embodiments, the first machine learning model may comprise the machine learning model trained in method 401, with brief reference to FIG. 4. The second machine learning model may comprise a long short-term memory machine learning model (LSTM 374), and/or any other suitable or desired machine learning model capable of aiding in identifying data of interest.

Machine learning system 370 may run the data through the machine learning models to determine whether the data is of interest. In various embodiments, machine learning system 370 inputs the preprocessed data into a first machine learning model (step 512). The first machine learning may comprise a Naïve Bayes machine learning model (NB 372). For example, and in accordance with various embodiments, the first machine learning model may comprise the machine learning model trained in method 401, with brief reference to FIG. 4. The first machine learning model may process the data based on a bag of words technique used to identify a given set of topics and a set of terms associated with each topic. The data classification may be polymorphic and may be associated with multiple topics. The first machine learning model may process the data to determine whether the data is of interest in the system. For example, and in accordance with various embodiments, an output from NB 372 may comprise a confidence (probability) score indicating whether the article is of interest or not (using any suitable confidence score scale).

Machine learning system 370 inputs the preprocessed data into a second machine learning model (step 514). The second machine learning model may be different than the first machine learning model. For example, the second machine learning model may comprise a long short-term memory machine learning model (LSTM 374), and/or any other suitable or desired machine learning model capable of aiding in identifying data of interest. LSTM model 374 may comprise one or more cells, input gates, out gates, and/or forget gates. Each cell may remember values over arbitrary time intervals, and the gates may regulate the flow of information into and out of the cell. LSTM model 374 may process the data to determine whether the data is of interest in the system. For example, and in accordance with various embodiments, an output from LSTM model 374 may comprise a confidence (probability) score indicating whether the article is of interest or not (using any suitable confidence score scale).

Machine learning system 370 inputs the preprocessed data into named entity recognition (NER) model 376 (step 516). NER 376 may be configured to process the data to locate named entity mentions in the unstructured data. In response to locating a named entity mention, NER model 376 may classify the named entity mention into one or more predefined categories such as, for example, a person name, an organization name, a location, a quantity, a monetary value, a percentage, and/or the like. For example, and in accordance with various embodiments, an output from NER model 376 may comprise the number of times the named entity appears in the data, the sentences where the entity appears in the data, the position of the entity within the sentence structure, and/or the like.

Machine learning system 370 inputs the preprocessed data into semantic role labeling (SRL) model 378 (step 518). SRL model 378 may comprise one or more semantic role labeling algorithms, relational machine learning algorithms, or the like. For example, SRL model 378 may be configured to perform various classification, identification, and predictions tasks such as, for example, collective classification (e.g., prediction of the class of several words or phrases in the data, based on the attribute and relationships between words or phrases), object link prediction (e.g., predicting whether two or more words or phrases are related), object link-based clustering (e.g., the grouping of similar words and phrases, the filtering of data that is relevant to a located entity, etc.), social network modelling, entity resolution (e.g., the identification of equivalent words and/or phrases for a common entity), and/or the like. In various embodiments, an output from SRL model 378 may identify actions, events, etc. that are happening about or to the named entity, whether the name entity is the source or target of the action, event, etc., and/or the like.

In various embodiments, machine learning system 370 may also analyze the data to determine word counts in the data, the frequency of terms or companies of interest occurring in the data, or the like.

In various embodiments, machine learning system 370 transmits the preprocessed data to sentiment scoring engine 380 (step 520). Sentiment scoring engine 380 calculates a sentiment score (step 522) based on the preprocessed data. Sentiment scoring engine 380 may implement any suitable sentiment scoring algorithm to generate the sentiment score, such as, for example, a VADER sentiment analysis, Stanford CoreNLP Sentiment Scoring, and/or any other suitable sentiment scoring algorithm or system. In various embodiments, sentiment scoring engine 380 may also implement multiple sentiment scoring algorithms to generate a plurality of sentiment scores. In that respect, sentiment scoring engine 380 may output each of the sentiment scores, a mathematical average of the sentiment scores, or the like. Sentiment scoring may comprise operations including detecting sentiment-bearing terms, determining the contextual valence and/or tonality of the terms determining the usage of the terms, and calculating an aggregate value (e.g., the sentiment score) for the data. The sentiment score may comprise any suitable score range (e.g., 0 to 1, 1 to 100, etc.) for positive, negative, neutral, and/or overall sentiment valence. For example, a "high" score for a specific sentiment valence may indicate that the data may be of interest. As a further example, a "low" score for a specific sentiment valence may indicate that the data may not be of interest. The scoring range to determine high scores and low scores may be manually defined and may be adjusted to account for false positives in the system. For example, a 50 or higher out of 100 may be defined as a high score, and a 49 or below may be defined as a low score. Sentiment scoring engine 380 may return the sentiment score to machine learning system 370.

In various embodiments, machine learning system 370 may receive the model outputs from models 372, 374, 376, 378, the sentiment score from sentiment scoring engine 380, and/or the preprocessed data, and may consolidate and process the outputs, scores, and data. For example, machine learning system 370 inputs the model outputs and the sentiment score into a gradient boosted regression tree (GBRT) machine learning model (step 524). The GBRT model may compute a sequence of binary trees wherein each successive tree is built to receive prediction residuals of the preceding tree. The GBRT model may consolidate and process the inputs to provide an ensemble determination of whether the data is of interest in the system. The GBRT model output (e.g., the final model output) may comprise an ensemble confidence (probability) score indicating whether the article is of interest or not (using any suitable confidence score scale).

In various embodiments, machine learning system 370 invokes alert engine 390 (step 526) based on the machine learning model outputs, the sentiment score, and/or the final model output (e.g., in response to determining that the data may be of interest). For example, machine learning system 370 may invoke alert engine 390 by transmitting the machine learning model outputs, the sentiment score, and/or the final model output to alert engine 390. Alert engine 390 generates a data alert 109 (step 528) in response to being invoked. Data alert 109 may comprise the data, the web link corresponding to the data, the machine learning outputs, the sentiment score, the final model output, and/or any other suitable or desired information. For example, alert engine 390 may retrieve data and/or the web link corresponding to the data from data retrieval and processing engine 360. Alert engine 390 transmits data alert 109 (step 530) for further review and processing. For example, and in accordance with various embodiments, data alert 109 may be manually reviewed. The manual review may comprise reviewing the data from data alert 109 to determine whether the data is of interest. In response to determining that the data is of interest, the manual review may result in making a determination based on the data. For example, in the financial industry, decisions based on credit lines, transaction accounts, or the like may be made based on the data. Based on the manual review, feedback may be provided to model building system 110 to update future training datasets in response to identifying false positives. For example, in response to manually detecting a false positive, the training data may be updated by evaluating and removing training keywords that may be irrelevant and/or leading to false positives. The updated training data may be fed into the machine learning models to reduce the number of false positives detected in the system. As a further example, and in accordance with various embodiments, data alert 109 may be transmitted to one or more internal decisioning engines for additional processing.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10 BASE-T, 100 BASE-T, 1000 BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the interne, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, MOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node)

to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the interne, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    retrieving, by a processor, unstructured data from an internet data source, wherein the retrieval is performed as a parallel process to evaluate data from various data sources;
    preprocessing, by the processor, the unstructured data by performing a part-of-speech tagging process;
    inputting, by the processor, the preprocessed unstructured data into a machine learning model and a sentiment scoring engine, wherein the machine learning model and the sentiment scoring engine are trained to identify data of interest to be used in a decisioning process;
    identifying, by the processor, the data of interest from the preprocessed unstructured data in response to an output of the machine learning model and the sentiment scoring engine indicating that the preprocessed unstructured data has a probability of being of interest; and
    generating, by the processor, a data alert in response to identifying the data of interest, wherein the data alert comprises at least one of the preprocessed unstructured data, a web link, or an output of at least one of the machine learning model or the sentiment scoring engine.

2. The method of claim 1, further comprising transmitting, by the processor, the data alert to a financial decisioning system to be used in a financial decisioning process of an account of a business, wherein the financial decisioning process comprises: closing or limiting credit accounts, extending lines of credit, opening transaction accounts, or closing transaction accounts.

3. The method of claim 1, further comprising:
    inputting, by the processor, the preprocessed unstructured data into a named entity recognition (NER) model, wherein the NER model is trained to identify the data of interest;
    identifying, by the processor, the data of interest from the preprocessed unstructured data in response to an output of the NER model indicating that the preprocessed unstructured data has a probability of being of interest; and
    generating, by the processor, the data alert in response to identifying the data of interest, wherein the data alert comprises at least one of the preprocessed unstructured data, the web link, or the output of at least one of the machine learning model, the sentiment scoring engine, or the NER model.

4. The method of claim 3, further comprising:
    inputting, by the processor, the output of the machine learning model, the sentiment scoring engine, and the NER model into a gradient boosted regression tree (GBRT) machine learning model; and
    identifying, by the processor, the data of interest based on an output of the GBRT machine learning model indicating that the preprocessed unstructured data has a probability of being of interest.

5. The method of claim 1, further comprising:
inputting, by the processor, the preprocessed unstructured data into a semantic role labeling (SRL) model, wherein the SRL model is trained to identify the data of interest;
identifying, by the processor, the data of interest from the preprocessed unstructured data in response to an output of the SRL indicating that the preprocessed unstructured data has a probability of being of interest; and
generating, by the processor, the data alert in response to identifying the data of interest, wherein the data alert comprises at least one of the preprocessed unstructured data, the web link, or the output of at least one of the machine learning model, the sentiment scoring engine, or the SRL model.

6. The method of claim 5, further comprising:
inputting, by the processor, the output of the machine learning model, the sentiment scoring engine, and the SRL model into a gradient boosted regression tree (GBRT) machine learning model; and
identifying, by the processor, the data of interest based on an output of the GBRT machine learning model indicating that the preprocessed unstructured data has a probability of being of interest.

7. The method of claim 1, further comprising:
inputting, by the processor, the output of the machine learning model and the sentiment scoring engine into a gradient boosted regression tree (GBRT) machine learning model; and
identifying, by the processor, the data of interest based on an output of the GBRT machine learning model indicating that the preprocessed unstructured data has a probability of being of interest.

8. A non-transitory computer readable medium including instructions for causing a computing system to perform operations comprising:
retrieving, by a processor, unstructured data from an internet data source, wherein the retrieval is performed as a parallel process to evaluate data from various data sources;
preprocessing, by the processor, the unstructured data by performing a part-of-speech tagging process;
inputting, by the processor, the preprocessed unstructured data into a machine learning model and a sentiment scoring engine, wherein the machine learning model and the sentiment scoring engine are trained to identify data of interest to be used in a decisioning process;
identifying, by the processor, the data of interest from the preprocessed unstructured data in response to an output of the machine learning model and the sentiment scoring engine indicating that the preprocessed unstructured data has a probability of being of interest;
generating, by the processor, a data alert in response to identifying the data of interest, wherein the data alert comprises at least one of the preprocessed unstructured data, a web link, or an output of at least one of the machine learning model or the sentiment scoring engine; and
transmitting, by the processor, the data alert to a financial decisioning system to be used in a financial decisioning process of an account of a business, wherein the financial decisioning process comprises: closing or limiting credit accounts, extending lines of credit, opening transaction accounts, or closing transaction accounts.

9. The non-transitory computer readable medium of claim 8, the operations further comprising transmitting, by the processor, the data alert to a financial decisioning system to be used in a financial decisioning process of an account of a business, wherein the financial decisioning process comprises: closing or limiting credit accounts, extending lines of credit, opening transaction accounts, or closing transaction accounts.

10. The non-transitory computer readable medium of claim 8, the operations further comprising:
inputting, by the processor, the preprocessed unstructured data into a named entity recognition (NER) model, wherein the NER model is trained to identify the data of interest;
identifying, by the processor, the data of interest from the preprocessed unstructured data in response to an output of the NER model indicating that the preprocessed unstructured data has a probability of being of interest; and
generating, by the processor, the data alert in response to identifying the data of interest, wherein the data alert comprises at least one of the preprocessed unstructured data, the web link, or the output of at least one of the machine learning model, the sentiment scoring engine, or the NER model.

11. The non-transitory computer readable medium of claim 10, the operations further comprising:
inputting, by the processor, the output of the machine learning model, the sentiment scoring engine, and the NER model into a gradient boosted regression tree (GBRT) machine learning model; and
identifying, by the processor, the data of interest based on an output of the GBRT machine learning model indicating that the preprocessed unstructured data has a probability of being of interest.

12. The non-transitory computer readable medium of claim 8, the operations further comprising:
inputting, by the processor, the preprocessed unstructured data into a semantic role labeling (SRL) model, wherein the SRL model is trained to identify the data of interest;
identifying, by the processor, the data of interest from the preprocessed unstructured data in response to an output of the SRL indicating that the preprocessed unstructured data has a probability of being of interest; and
generating, by the processor, the data alert in response to identifying the data of interest, wherein the data alert comprises at least one of the preprocessed unstructured data, the web link, or the output of at least one of the machine learning model, the sentiment scoring engine, or the SRL model.

13. The non-transitory computer readable medium of claim 12, the operations further comprising:
inputting, by the processor, the output of the machine learning model, the sentiment scoring engine, and the SRL model into a gradient boosted regression tree (GBRT) machine learning model; and
identifying, by the processor, the data of interest based on an output of the GBRT machine learning model indicating that the preprocessed unstructured data has a probability of being of interest.

14. The non-transitory computer readable medium of claim 8, the operations further comprising:
inputting, by the processor, the output of the machine learning model and the sentiment scoring engine into a gradient boosted regression tree (GBRT) machine learning model; and identifying, by the processor, the data of interest based on an output of the GBRT machine learning model indicating that the preprocessed unstructured data has a probability of being of interest.

15. A computing system comprising:
a memory storing instructions;
a processor, coupled to the memory, configured to process the stored instructions to:
retrieve unstructured data from an internet data source, wherein the retrieval is performed as a parallel process to evaluate data from various data sources;
preprocess the unstructured data by performing a part-of-speech tagging process;
input the preprocessed unstructured data into a machine learning model and a sentiment scoring engine, wherein the machine learning model and the sentiment scoring engine are trained to identify data of interest to be used in a decisioning process;
identify the data of interest from the preprocessed unstructured data in response to an output of the machine learning model and the sentiment scoring engine indicating that the preprocessed unstructured data has a probability of being of interest;
generate a data alert in response to identifying the data of interest, wherein the data alert comprises at least one of the preprocessed unstructured data, a web link, or an output of at least one of the machine learning model or the sentiment scoring engine; and
transmit the data alert to a financial decisioning system to be used in a financial decisioning process of an account of a business, wherein the financial decisioning process comprises: closing or limiting credit accounts, extending lines of credit, opening transaction accounts, or closing transaction accounts.

16. The computing system of claim 15, wherein the processor is further configured to transmit the data alert to a financial decisioning system to be used in a financial decisioning process of an account of a business, wherein the financial decisioning process comprises: closing or limiting credit accounts, extending lines of credit, opening transaction accounts, or closing transaction accounts.

17. The computing system of claim 15, wherein the processor is further configured to:
input the preprocessed unstructured data into a named entity recognition (NER) model, wherein the NER model is trained to identify the data of interest;
identify the data of interest from the preprocessed unstructured data in response to an output of the NER model indicating that the preprocessed unstructured data has a probability of being of interest; and
generate the data alert in response to identifying the data of interest, wherein the data alert comprises at least one of the preprocessed unstructured data, the web link, or the output of at least one of the machine learning model, the sentiment scoring engine, or the NER model.

18. The computing system of claim 17, wherein the processor is further configured to:
input the output of the machine learning model, the sentiment scoring engine, and the NER model into a gradient boosted regression tree (GBRT) machine learning model; and
identify the data of interest based on an output of the GBRT machine learning model indicating that the preprocessed unstructured data has a probability of being of interest.

19. The computing system of claim 15, wherein the processor is further configured to:
input the preprocessed unstructured data into a semantic role labeling (SRL) model, wherein the SRL model is trained to identify the data of interest;
identify the data of interest from the preprocessed unstructured data in response to an output of the SRL indicating that the preprocessed unstructured data has a probability of being of interest; and
generate the data alert in response to identifying the data of interest, wherein the data alert comprises at least one of the preprocessed unstructured data, the web link, or the output of at least one of the machine learning model, the sentiment scoring engine, or the SRL model.

20. The computing system of claim 15, wherein the processor is further configured to:
input the output of the machine learning model and the sentiment scoring engine into a gradient boosted regression tree (GBRT) machine learning model; and
identify the data of interest based on an output of the GBRT machine learning model indicating that the preprocessed unstructured data has a probability of being of interest.

* * * * *

UNITED STATES PATENT AND TRADEMARK OFFICE
CERTIFICATE OF CORRECTION

PATENT NO. : 11,714,968 B2
APPLICATION NO. : 17/679498
DATED : August 1, 2023
INVENTOR(S) : Batra et al.

Page 1 of 1

It is certified that error appears in the above-identified patent and that said Letters Patent is hereby corrected as shown below:

In the Specification

In Column 2, Line 65, delete "interne." and insert -- Internet. --.

In Column 11, Line 50, delete "nm" and insert -- run --.

In Column 15, Line 39, delete "interne," and insert -- Internet, --.

In Column 19, Line 37, delete "MOSS®," and insert -- JOSS®, --.

In Column 25, Line 19, delete "interne," and insert -- Internet, --.

Signed and Sealed this
First Day of April, 2025

Coke Morgan Stewart
*Acting Director of the United States Patent and Trademark Office*